United States Patent Office 3,463,445
Patented Aug. 26, 1969

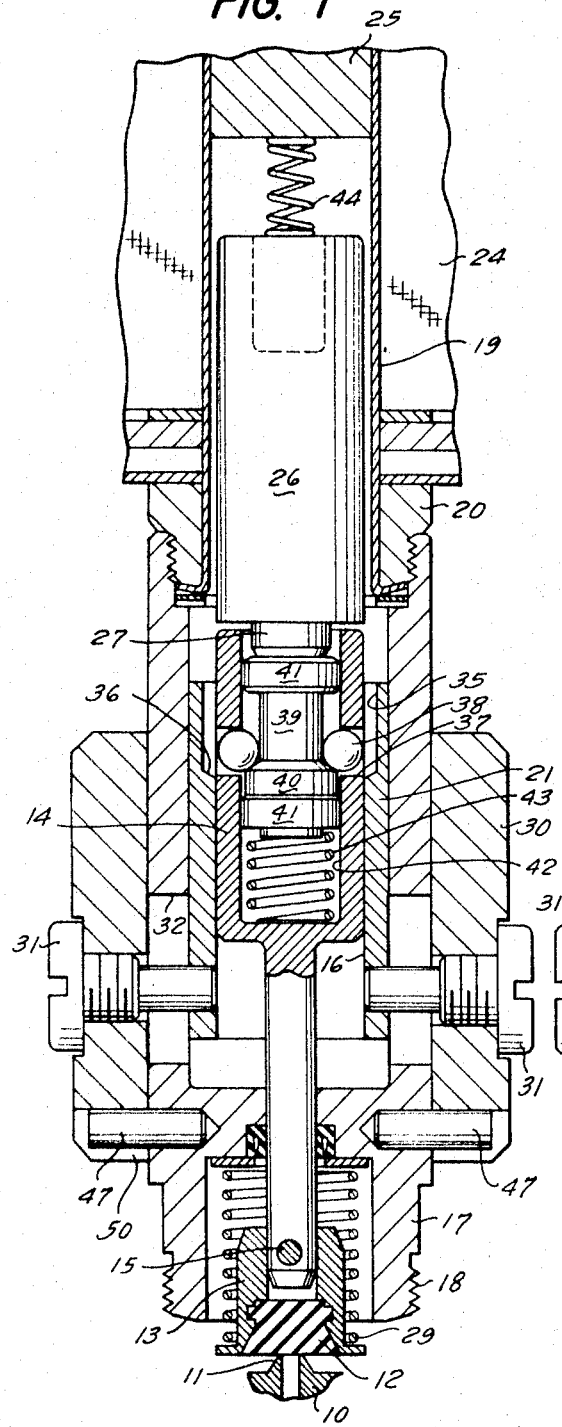
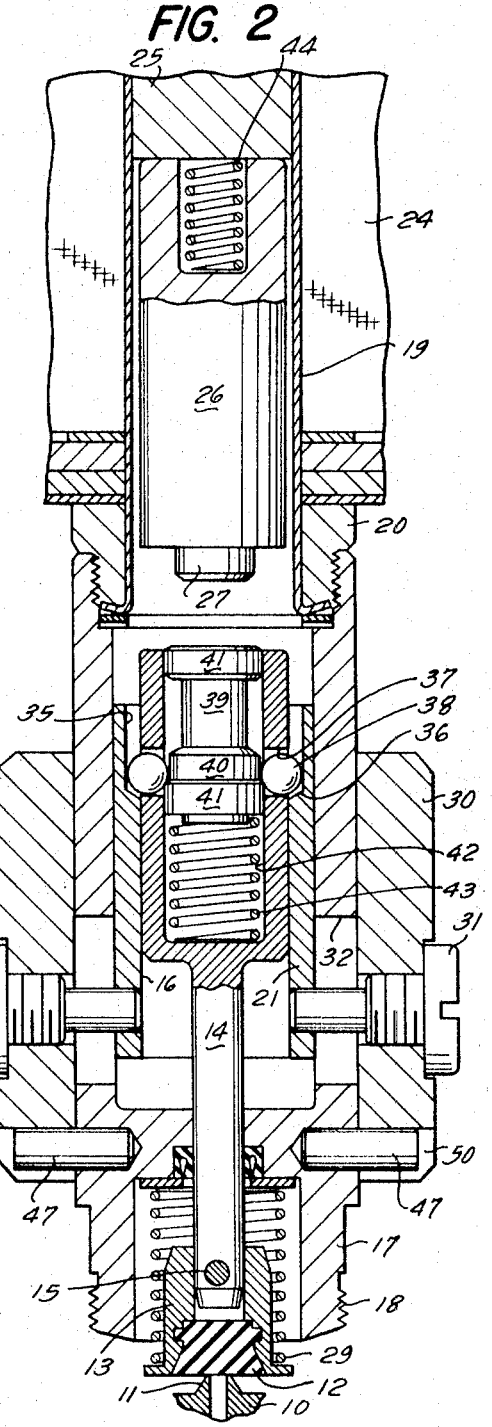

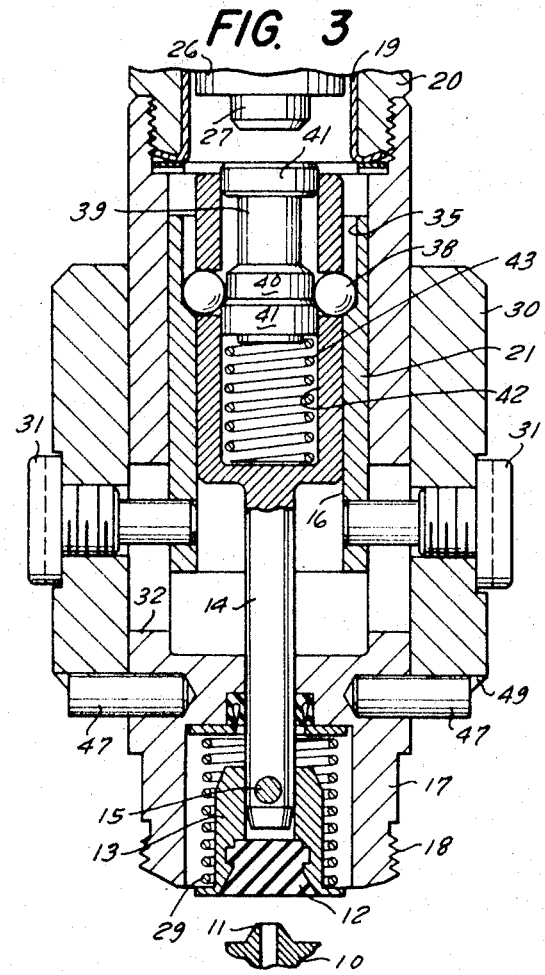
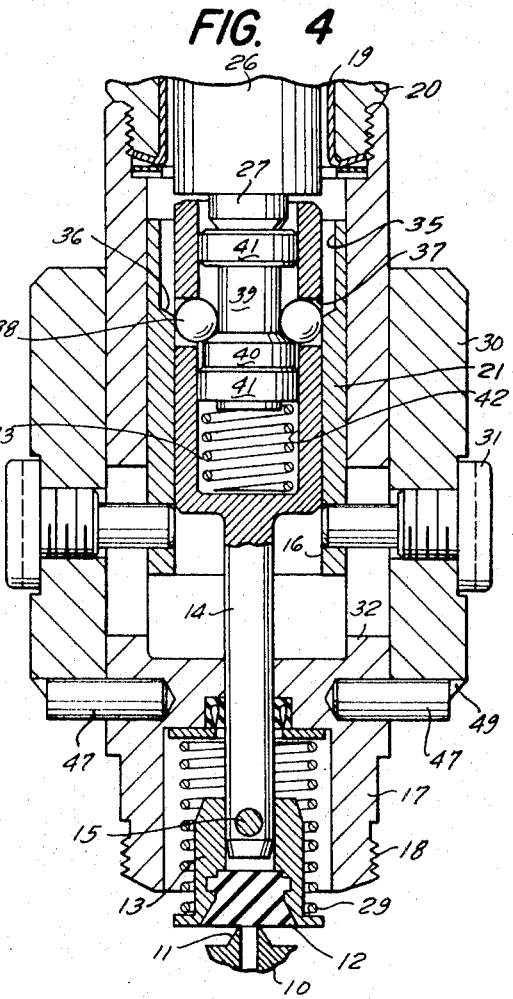
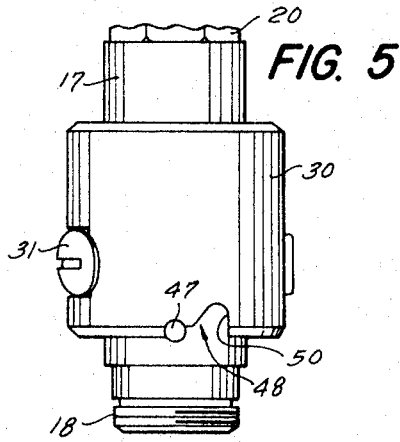
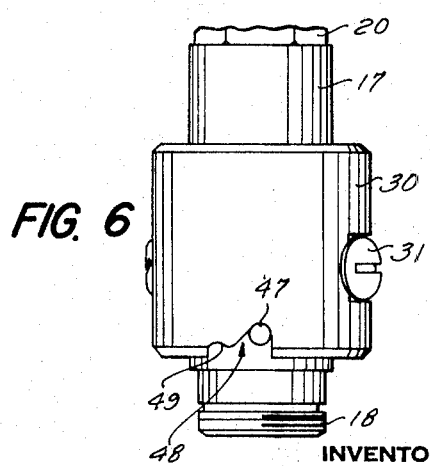

3,463,445
VALVE HAVING SOLENOID CONTROLLED CONNECTION BETWEEN MANUAL OPERATOR AND VALVE ELEMENT
Alan W. Churchill, Morristown, and Arthur W. Freeman, Saddle Brook, N.J., assignors to Automatic Switch Company, a corporation of New York
Filed Jan. 3, 1968, Ser. No. 695,434
Int. Cl. F16k 31/46, 31/10
U.S. Cl. 251—70                      6 Claims

ABSTRACT OF THE DISCLOSURE

Valve body has seat and elongated opening slidably accommodating a hollow sleeve. Inner wall of sleeve has recess, and valve disk carrier slidable within sleeve has transverse hole accommodating a ball. Manually slidable member on exterior of valve body connected to sleeve. Wedging element within carrier urges ball into recess to latch sleeve and carrier, when solenoid is energized.

---

This invention relates to manually operable but electrically controlled valves, and more particularly to such a valve provided with a "free handle" safety feature. A valve of this general character is shown in FIGS. 9 and 10 of copending application Ser. No. 455,165, filed May 12, 1965, now Patent No. 3,385,559.

In valves provided with a free handle feature, a manually operable member is provided for opening and closing the valve. However, motion of the manual operator is not transmitted directly to the valve member, but instead is transmitted via an intermediate member. Additional means, which are electrically controlled such as by a solenoid, determines whether or not movement of the manual operator is transmitted, via the intmediate member, to the valve members. Valves of this type have been used in situations wherein it is desired to operate a valve manually, but only when a predetermined electrical signal is present (or absent).

The problem with known arrangements of this type is that they involve relatively complicated combinations of levers and latches controlled by solenoids.

It is an object of the present invention to provide a valve of the type mentioned which is much simpler to manufacture, and more compact, than arrangements heretofore known for accomplishing the same purpose. A feature of the invention resides in the enclosure of all moving parts to prevent their being adversely affected by the environment in which the valve is used.

In general, the invention includes a valve disk carrier slidable within an intermediate member in the form of a sleeve, the sleeve in turn being slidable within an elongated opening fixed with respect to the valve body. A manually manipulable member, or handle, exterior of the valve body is slidable longitudinally with respect to the elongated opening, and is connected to the sleeve so that the latter partakes of movements of the handle. A latching arrangement, adapted to interconnect the disk carrier and sleeve, includes a wedging element slidable within the disk carrier, and a ball accommodated within a transverse opening in the carrier. A latching spring urges the wedging element in a direction tending to push the ball into a recess in the inner wall of the sleeve, to thereby latch together the carrier and sleeve so that the movements of the handle are transmitted to the carrier, and the armature of a solenoid is arranged for rendering the latching spring ineffective.

According to a preferred embodiment of the invention, an unlatching spring, stronger than the latching spring, is provided for urging the armature and wedging element in a direction against the force of the latching spring, and the unlatching spring is overcome upon energization of the solenoid. In this case, the valve is of the type which requires that the solenoid be energized to permit latching together of the carrier and sleeve. As will be described below, the valve may also be constructed so that latching together of the carrier and sleeve is permitted only when the solenoid is deenergized.

Additional features and advantages of the invention will be apparent from the following description in which reference is made to the accompanying drawings.

In the drawings:

FIG. 1 is a longitudinal cross-section of a preferred embodiment of this invention, only a portion of the valve body being shown, the valve being closed, the solenoid being deenergized, and handle being down;

FIG. 2 is a view similar to FIG. 1, the valve being closed, the solenoid being energized, and the handle being down;

FIG. 3 is a fragmentary view similar to FIG. 1, the valve being open, the solenoid being energized, and the handle being up;

FIG. 4 is a view similar to FIG. 3, the valve being closed, the solenoid being deenergized, and the handle being up;

FIG. 5 is an elevational view showing the handle in its up position; and

FIG. 6 is an elevational view showing the handle in its down position.

The valve chosen to illustrate this invention, and shown in FIGS. 1 and 2, comprises a valve body 10 (shown partially) having the usual inlet and outlet openings (not shown), a valve seat 11 between them, and a valve disk 12 arranged for movement toward and away from the valve seat. The disk 12 is retained in a holder 13 secured to the lower end of a valve disk carrier 14 by means of a pin 15 extending through aligned holes in the holder and carrier. The carrier 14 is slidably arranged within an opening 16 in a sleeve 21, which in turn is slidably arranged within an elongated opening in a member 17 threadably engageable at 18 with the valve body 10. At its other end, the member 17 is secured to the lower end of a solenoid core tube 19 by a nut 20.

Supported on and surrounding the core tube 19 is a solenoid winding 24. Tightly accommodated within the upper end of the core tube 19 is a plug nut 25, and axially slidable within the core tube is an armature 26 controlled by the soleoid 24. The lower end of the armature 26 is formed with a downwardly extending projection 27.

A compression spring 29 constantly urges the carrier 14 toward the valve seat 11, and when the valve is closed the spring 29 presses the disk 12 against the seat. An annular member 30, hereinafter sometimes referred to as the handle, surrounds and is slidable along the member 17, and is connected to the sleeve 21 by a pair of lug screws 31 passing through aligned holes in the handle and carrier. Elongated slots 32 are provided in the wall of member 17 through which the screws 31 pass, so that the handle 30 and sleeve 21, may slide freely in a longitudinal direction with respect to the member 17. The handle is shiftable between two stable positions defined by the cooperation between a pair of abutment pins 47 projecting radially from the member 17 in diametrically opposite directions, and a pair of notches 48 (one notch being shown in each of FIGS. 5 and 6) formed in the lower edge of the handle 30 and located to cooperate with the pins 47. Each notch has two lobes, one lobe 49 being shallow and the other lobe 50 being deep. Thus, when the deep lobes 50 of the notches 48 engage their respective abutment pins 47, the handle 30 is in its lower position (FIGS. 1 and 2), and when the handle 30 is lifted and rotated through a small angle so that the shallow lobes 49 are brought into engagement with the pins 47, the handle 30 is in its upper position. By manually grasping the sleeve 30 and sliding it upwardly (in FIG. 1), the handle 21 is also moved upwardly. However, unless the sleeve 21 and valve disk carrier 14 are latched together, no movement is transmitted to the carrier and the valve remains closed under the influence of closing spring 29.

A latching arrangement is provided for interconnecting the sleeve 21 and carrier 14. This arrangement is of the ball-lock type, and includes an annular recess 35 formed in the inner wall of the opening 16 in the sleeve 21, an inclined shoulder 36 being formed at the end of the recess closest to the valve seat 11. The disk carrier 14 is provided with a transverse hole 37 so located that it is in registry or alignment with the recess 35 when the valve is closed and the handle 30 is in its lower position (FIGS. 1 and 2). Mounted for free movement within the transverse hole 37 is a ball 38 whose diameter is only slightly less than that of the hole 37 but greater than the depth of the recess 35. Preferably, the hole 37 extends diametrically through the carrier 14, as shown, and there is a ball 38 at each end of the hole.

Axially slidable within a bore 42 in the valve disk carrier 14 is a wedging element 39 having a central region of smallest diameter, a wedging portion 40 below the central region, and an enlarged region 41 at each end, the regions 41 serving to guide the movement of the wedging element within the bore 42. The combined radii of the wedging portion 40 and ball 38 exceeds the radius of the opening 16. Consequently, when the valve is closed and the solenoid is deenergized, as in FIG. 1, the balls 38 are located in the path of upward movement of the wedging portion 40. However, the combined radii of the wedging portion and ball is less than the radius of the recess 35; hence, when the wedging portion 40 moves upwardly into radial alignment with the hole 37, it pushes the balls 38 into the recess 35. A latching spring 43 located between the bottom wall of the bore 42 and the lower end of the wedging element 39 constantly urges the latter upwardly, i.e., in a direction tending to push the balls 38 radially outward. An unlatching or return spring 44, between the plug nut 25 and the upper end of the armature 26, is stronger than the latching spring 43 and constantly urges the armature downwardly.

The operation of the valve is as follows: with the solenoid 24 deenergized and the sleeve 30 in its lower position, the valve assumes the condition shown in FIG. 1, i.e., it is closed. In this condition, the unlatching spring 44 pushes the armature 26 down, and the armature in turn pushes the wedging element 39 down, against the force of the latching spring 43, so that the wedging portion 40 is out of radial alignment with the hole 37. Consequently, the balls 38 are not forced into the recess 35, and the carrier 14 is free to slide with respect to the sleeve 21. As long as the solenoid 24 remains deenergized, movement of the handle upwardly is transmitted only to the sleeve 21 and not to the carrier 14. Consequently, the valve cannot be opened.

However, when the solenoid 24 is energized, the armature 26 moves up against the plug nut 25 (FIG. 2) and compresses the spring 44 thus rendering the latter ineffective for overcoming the force of latching spring 43. The latching spring is therefore free to shift the wedging element 39 upwardly and, as shown in FIG. 2, the wedging portion 40 pushes the balls 38 radially outward into the recess 35. As long as the wedging portion 40 remains in the plane of the balls 38, the balls are held in the recess 35. In this position, the balls 38 are operatively interposed between the carrier 14 and sleeve 21.

Now, in this latched condition, should the handle 30 be manually raised (FIG. 3) the upward movement is transmitted via the sleeve 21 and balls 38, to the carrier 14, and the valve disk 12 is lifted off the valve seat 11 against the force of closing spring 29. If, in this raised position, the handle 30 is rotated through a small angle, from its angular position in FIG. 6 to that of FIG. 5, the handle will remain in its raised condition, even after it is released, by cooperation of the pins 47 with the shallow lobes 49. Consequently, the valve will remain open as long as the solenoid 24 remains energized.

Should the solenoid 24 be deenergized after the condition shown in FIG. 3 is achieved, the unlatching spring 44 pushes the armature 26 downwardly, whereupon the armature projection 27 engages the wedging element 39 and pushes it downwardly, overcoming the force of latching spring 43. Consequently, the balls 38 are no longer held in the recess 35 by the wedging portion 40, and the balls roll inwardly along the shoulder 36 (FIG. 4). The carrier 14 and sleeve 21 are thereby unlatched, and the spring 29 moves the valve disk 12 against the seat 11 to close the valve. In this condition, as shown in FIG. 4, the recess 35 is out of registry with the holes 37. Therefore, should the solenoid be energized again, the wedging element will not be able to push the balls 38 into the recess. Consequently, before the valve can be opened again, the handle 30 must be returned to its lower position (FIGS. 1 and 6) to bring the recess 35 and holes 37 into registry.

It will be appreciated that the valve just described can be initially opened, and maintained open, only when the solenoid is energized. If desired, the valve may be altered so that it can be open and maintained open only when the solenoid is denergized. This is accomplished by eliminating the spring 43 and rotating the wedging element 19 180° about a horizontal axis so that the wedging portion 40 is positioned above the balls 38 when the valve is closed. The spring 44 thereupon becomes the latching spring, and when the solenoid is deenergized the spring 44 via the armature 26 and wedging element 39 pushes the balls 38 into the recess 35, whereby movements of the handle 30 are transmitted to the carrier 14. A stem (not shown) is secured to the lower end of armature 26, and is arranged to slide axially through a bore in the wedging element 39, the stem having an enlargement at its lower end. Thus, when the solenoid is energized and the armature moves upwardly to compress the spring 44, the enlargement lifts the wedging element and allows the balls 38 to roll inwardly and unlatch the carrier 14 and sleeve 21. The spring 29 thereupon closes the valve. An arrangement of this type ie illustrated in FIGS. 3–5 of copending application Ser. No. 695,431, filed on the same date as this application.

The invention has been shown and described in preferred form only, and by way of example, and many variations may be made in the invention which will still be comprised within its spirit. It is understood, therefore, that the invention is not limited to any specific form or embodiment except isofar as such limitation are included in the appended claims.

What is claimed is:
1. A valve comprising:
 (a) a valve body formed with a valve seat;
 (b) an elongated member fixed with respect to said valve body and having at least a partially hollow interior;
 (c) a sleeve slidably arranged within said member, the inner wall of said sleeve having a recess;
 (d) a valve disk carrier slidably arranged within said sleeve, said carrier having a transverse hole so located that it may be aligned with said recess when the valve is closed;
 (e) a ball within said hole movable radially into said recess when alignment occurs, said recess being of less depth than the ball diameter;
 (f) a wedging element slidably arranged wthin said disk carrier and shaped to engage said ball and push it radially outward;
 (g) a closing spring urging said carrier toward said valve seat;

(h) a manually operable member movable with respect to said valve body;

(i) means for transmitting the movements of said manually operable member to said sleeve so as to move the latter toward and away from said valve seat; and (j) a solenoid and spring means cooperatively effective to control the relative positions of said wedging element and valve disk carrier, whereby said ball may be caused to intrude into said recess to latch said valve disk carrier and sleeve together so that movements of said manually operable member are transmitted to said valve disk carrier.

2. A valve as defined in claim 1 wherein said manually operable member is an anular member surrounding, and axially slidable with respect to, said elongated member; and said transmitting means is a pin extending through the wall of said elongated member and connecting said annular member and sleeve.

3. A valve as defined in claim 1 including abutment means fixed with respect to said valve body, and complementary abutment means fixed with respect to said manually operable member, said abutment means being engageable in two different angular positions of said manually operable member with respect to said valve body, said sleeve being maintained in a position closer to or farther from said valve seat depending upon the position of engagement of said abutment means.

4. A valve as defined in claim 1 wherein said spring means includes a latching spring urging said wedging element in a direction which tends to push said ball radially outward, and thereby causes said ball to intrude into said recess upon alignment between said hole and recess; and said solenoid having a movable armature for rendering said latching spring ineffective.

5. A valve as defined in claim 4 wherein said spring means also includes an armature return spring for urging said armature and wedging member in a direction opposite to the direction in which said latching spring urges said wedging member; said return spring being rendered ineffective upon energization of said solenoid and movement of said armature; whereby when said manually operable member is adjusted so that said sleeve is located in its position closer to said valve seat, upon energization of said solenoid said wedging member pushes said ball into said recess.

6. A valve as defined in claim 4 wherein said valve seat; elongated member; sleeve; valve disk carrier; wedging element; manually operable member; solenoid; armature; and springs are all axially aligned.

References Cited

UNITED STATES PATENTS

| | | | |
|---|---|---|---|
| 775,054 | 11/1904 | Waterman | 251—70 |
| 2,224,147 | 12/1940 | Ehlers | 251—70 |
| 2,888,025 | 5/1959 | Greenwood et al. | 251—74 XR |
| 3,033,512 | 5/1962 | Lieser | 251—74 XR |
| 3,089,507 | 5/1963 | Drake et al. | 251—68 XR |
| 3,115,330 | 12/1963 | Dollison | 251—74 XR |
| 3,174,500 | 3/1965 | Johnson et al. | 251—75 XR |
| 3,385,559 | 5/1968 | Churchill | 231—70 |
| 3,386,391 | 6/1968 | Garrett | 231—75 |

RONALD FELDBAUM, Primary Examiner